(12) United States Patent
Wesson et al.

(10) Patent No.: US 9,546,447 B2
(45) Date of Patent: Jan. 17, 2017

(54) ELEVATOR LOAD BEARING ASSEMBLY HAVING A JACKET WITH MULTIPLE POLYMER COMPOSITIONS

(75) Inventors: John P. Wesson, Vernon, CT (US);
Mark S. Thompson, Tolland, CT (US);
James R. Irish, Vernon, CT (US);
William A. Veronesi, Hartford, CT (US); John T. Pitts, Avon, CT (US);
William C. Perron, Burlington, CT (US); Ary Mello, Farmington, CT (US);
Hugh James O'Donnell, Longmeadow, MA (US); Kathryn R. Sherrick, Bristol, CT (US); Richard Phillips, Trevaux (CH); Jotti Pierangelo, Niederwil (CH)

(73) Assignee: Otis Elevator Company, Farmington, CT (US)

( * ) Notice: Subject to any disclaimer, the term of this patent is extended or adjusted under 35 U.S.C. 154(b) by 2513 days.

(21) Appl. No.: 12/089,764

(22) PCT Filed: Oct. 27, 2005

(86) PCT No.: PCT/US2005/038788
§ 371 (c)(1),
(2), (4) Date: Apr. 10, 2008

(87) PCT Pub. No.: WO2007/050069
PCT Pub. Date: May 3, 2007

(65) Prior Publication Data
US 2008/0296544 A1    Dec. 4, 2008

(51) Int. Cl.
*B66D 1/00* (2006.01)
*D07B 1/16* (2006.01)
(Continued)

(52) U.S. Cl.
CPC ............. *D07B 1/162* (2013.01); *B29C 47/027* (2013.01); *B29C 47/065* (2013.01);
(Continued)

(58) Field of Classification Search
CPC ........... D07B 1/162; D07B 1/22; D07B 5/005; D07B 2201/1008; D07B 2201/2088; D07B 2201/2092; D07B 2401/2075; D07B 2501/2007; Y10T 29/49709
See application file for complete search history.

(56) References Cited

U.S. PATENT DOCUMENTS 3,505,250 A * 4/1970 Saunders ................... 521/157
3,637,539 A * 1/1972 Farum ....................... 521/167
(Continued)

FOREIGN PATENT DOCUMENTS

EP     0722053 A2     7/1996
EP     0989324 A1 *   3/2000
(Continued)

OTHER PUBLICATIONS

DOTMAR Engineering Plastics, undated.*
(Continued)

*Primary Examiner* — Elizabeth M Cole
(74) *Attorney, Agent, or Firm* — Carlson, Gaskey & Olds

(57) ABSTRACT

An elevator load bearing assembly (30) includes a jacket (34) having different portions comprising different polymer compositions. In a disclosed example, a plurality of tension members (32) are at least partially surrounded by a first portion (36) comprising a first polymer composition. A second portion (38) establishes at least one exterior surface (40) of the jacket (34) and comprises a second polymer composition. In one example, a surface-modifying agent is added to alter the composition of at least a portion of the (Continued)

jacket (34). In another example, co-extrusion techniques using different polymer compositions establish different portions of the jacket (34).

16 Claims, 2 Drawing Sheets

(51) Int. Cl.
*B29C 47/02* (2006.01)
*B29C 47/06* (2006.01)
*B29C 47/14* (2006.01)
*B66B 7/06* (2006.01)
*B29C 47/00* (2006.01)
*D07B 1/22* (2006.01)

(52) U.S. Cl.
CPC ............ *B29C 47/145* (2013.01); *B66B 7/062* (2013.01); *D07B 5/006* (2015.07); *B29C 47/0019* (2013.01); *D07B 1/22* (2013.01); *D07B 2201/1008* (2013.01); *D07B 2201/2087* (2013.01); *D07B 2201/2088* (2013.01); *D07B 2201/2092* (2013.01); *D07B 2401/2075* (2013.01); *D07B 2501/2007* (2013.01); *Y10T 29/49709* (2015.01)

(56) References Cited

U.S. PATENT DOCUMENTS

| | | | | |
|---|---|---|---|---|
| 3,656,360 | A * | 4/1972 | Fix | 474/250 |
| 3,803,281 | A * | 4/1974 | Fix | 264/102 |
| 3,824,199 | A * | 7/1974 | Nadeau | 521/51 |
| 4,445,593 | A * | 5/1984 | Coleman | B66B 7/064 174/113 C |
| 4,624,097 | A * | 11/1986 | Wilcox | 57/232 |
| 4,724,929 | A | 2/1988 | Coleman et al. | |
| 4,734,545 | A * | 3/1988 | Susuki et al. | 174/120 SR |
| 4,762,751 | A * | 8/1988 | Girgis et al. | 428/378 |
| 5,566,786 | A * | 10/1996 | De Angelis et al. | 187/266 |
| 5,660,932 | A * | 8/1997 | Durston | 428/373 |
| 6,287,687 | B1 * | 9/2001 | Yializis et al. | 428/364 |
| 6,295,799 | B1 | 10/2001 | Baranda | |
| 6,653,943 | B2 | 11/2003 | Lamb et al. | |
| 6,672,046 | B1 | 1/2004 | Prewo et al. | |
| 7,036,298 | B2 * | 5/2006 | Honda | 57/214 |
| 7,661,514 | B2 * | 2/2010 | Ach | 187/251 |
| 7,883,634 | B2 * | 2/2011 | Thompson et al. | 216/83 |
| 2003/0024770 | A1 | 2/2003 | O'donnell et al. | |
| 2003/0092524 | A1 * | 5/2003 | Baranda et al. | 474/266 |
| 2003/0121729 | A1 | 7/2003 | Heinz et al. | |
| 2007/0102183 | A1 | 5/2007 | Jotti et al. | |
| 2008/0156592 | A1 * | 7/2008 | Thompson et al. | 187/411 |
| 2008/0296544 | A1 * | 12/2008 | Wesson et al. | 254/264 |

FOREIGN PATENT DOCUMENTS

| | | |
|---|---|---|
| EP | 0934440 B1 | 8/2002 |
| EP | 1273695 A1 | 1/2003 |
| EP | 1418267 A1 | 5/2004 |
| EP | 1508544 A1 | 2/2005 |
| EP | 1586526 A1 | 10/2005 |
| WO | WO 03101876 A1 * | 12/2003 |
| WO | WO 2005054569 A2 * | 6/2005 |
| WO | 2005094255 A2 | 10/2005 |
| WO | WO 2005094255 A2 * | 10/2005 |
| WO | WO 2006085881 A1 * | 8/2006 |

OTHER PUBLICATIONS

Supplementary European Search Report for Application No. EP 05 82 5117 mail Apr. 10, 2013.

International Search Report and Written Opinion of the International Searching Authority for International application No. PCT/US05/38788 mailed Oct. 2, 2006.

International Preliminary Report on Patentability for International application No. PCT/US2005/038788 mailed May 8, 2008.

* cited by examiner

ELEVATOR LOAD BEARING ASSEMBLY HAVING A JACKET WITH MULTIPLE POLYMER COMPOSITIONS

FIELD OF THE INVENTION

This invention generally relates to elevator systems. More particularly, this invention relates to load bearing assemblies for use in elevator systems.

DESCRIPTION OF THE RELATED ART

Elevator systems are well known and in wide-spread use. Traditional traction elevator systems included steel ropes for suspending an elevator car for movement within a hoistway between different levels in a building, for example. In most examples, a counterweight was also suspended by the steel ropes.

More recently, steel ropes have been replaced with alternative load bearing assemblies. Such assemblies typically include a polymer coating over at least one tension member. Example tension members include steel cords or polymer strands. While such arrangements have provided advances, they are not without shortcomings and difficulties.

For example, when manufacturing a load bearing assembly having a polymer coating over a tension member, there are competing design considerations. On the one hand, it is desirable to have the polymer coating bond sufficiently with the tension member to provide a sufficient pull out strength that keeps the jacket and the tension member in a fixed relationship. On the other hand, it is desirable to avoid adhesion between an outer surface of the jacket and a sheave over which the load bearing assembly travels during elevator system operation. For example, if there is too much friction between the jacket and a traction sheave, the polymer material of the jacket may be damaged or worn when there is some slip.

Although one polymer jacket material may provide good performance characteristics in one regard, it may provide a disadvantage in another. For example, some polymer materials provide a sufficient pull out strength but, at the same time, present the possibility for undesirable adhesion between the outer surface of the jacket and a sheave in the elevator system.

There is a need for an improved arrangement that satisfies internal load bearing assembly characteristic requirements and external load bearing assembly characteristic requirements even when those characteristics may differ. This invention addresses that need and provides an optimized load bearing assembly configuration.

SUMMARY OF THE INVENTION

An exemplary method of making a load bearing assembly for use in an elevator system includes using a first polymer composition and a second, different polymer composition to form a jacket that at least partially surrounds at least one tension member.

One example method of making a load bearing member for use in an elevator system includes forming a polymer jacket at least partially surrounding at least one tension member. Applying at least one surface-modifying component to an exterior surface of the formed jacket achieves a desired effect for the exterior of the jacket.

In one example, the surface-modifying component interacts with the polymer composition near the exterior surface of the jacket such that an exteriorly-facing portion of the jacket has a resulting second, different polymer composition compared to a remainder of the jacket.

Utilizing different polymer compositions for different portions of the jacket allows for achieving the desired results for each portion of the load bearing assembly.

Many different polymers can be used to make the composition for each portion. Example polymer types include, but are not necessarily limited to, polyurethanes of all subtypes, nylons, polyesters, polyoelfins, fluorinated polymers, other halogenated polymers, vulcanizable natural or synthetic rubber and silicones.

In one example, the first and second polymer compositions comprise the same base polyurethane material and at least one of the compositions includes at least one additional component. The first and second different polymer types may also contain different additives. In another example, the first and second polymer compositions each comprise a different polyurethane material.

An example load bearing assembly for use in an elevator system includes at least one elongated tension member. A polymer jacket at least partially surrounds the tension member. The polymer jacket has a first portion that contacts the tension member and a second portion that defines an exterior surface of the jacket. The first portion comprises a first polymer composition. The second portion comprises a second, at least partially different polymer composition.

The various features and advantages of this invention will become apparent to those skilled in the art from the following detailed description of currently preferred embodiments. The drawings that accompany the detailed description can be briefly described as follows.

DETAILED DESCRIPTION OF THE PREFERRED EMBODIMENTS

Figure 1:
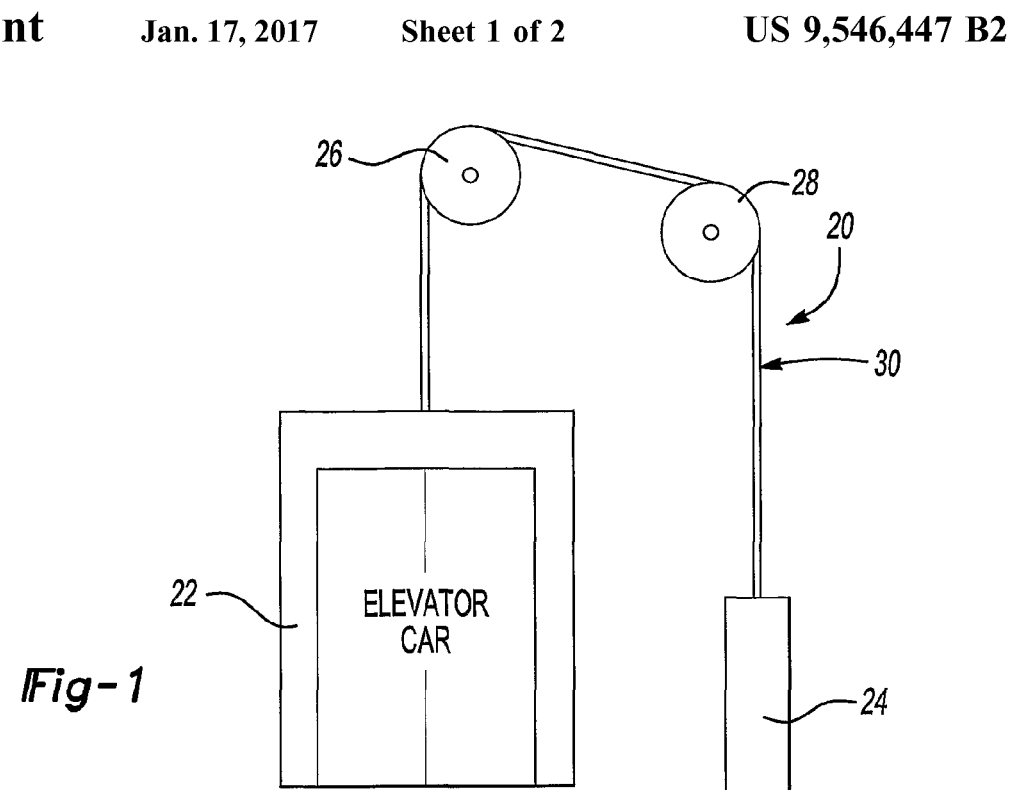
FIG. 1 schematically illustrates an elevator system including a load bearing assembly designed according to an embodiment of this invention.

FIG. 1 schematically shows an elevator system 20 including an elevator car 22 and counterweight 24 that are movable within a hoistway in a known manner. At least one drive sheave 26 operates in a known manner and a load bearing assembly 30, which suspends the elevator car 22 and counterweight 24, moves responsive to movement of the drive sheave 26 to cause the desired movement of the elevator car 22. The illustrated example includes an idler sheave 28.

It should be noted that this invention is not limited to elevator systems that include a counterweight. Additionally, although a selected embodiment of a load bearing assembly 30 is shown schematically in FIG. 2, the configuration of a load bearing assembly designed according to an embodiment of this invention may take other forms.

Figure 2:
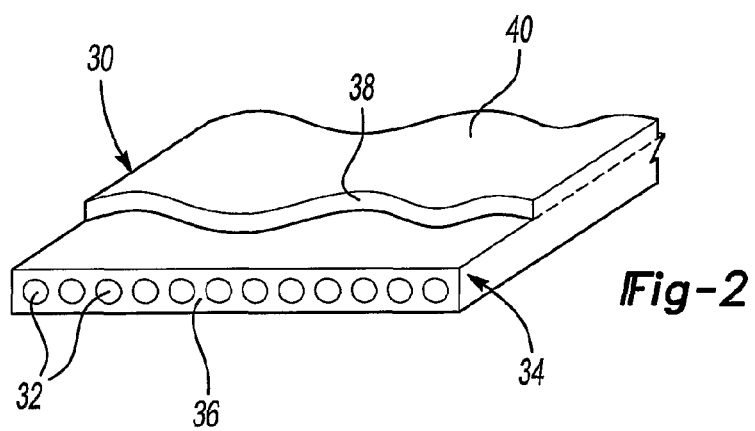
FIG. 2 schematically shows selected portions of an example load bearing assembly.

In the example of FIG. 2, the load bearing assembly 30 includes a plurality of elongated tension members 32. In one example, the tension members 32 comprise a polymer material. In another example, the tension members 32 comprise steel cords.

A polymer jacket 34 at least partially surrounds the tension members 32. A first portion 36 of the jacket 34 contacts the tension members 32. The first portion 36 has a first polymer composition to provide good adhesion between the jacket 34 and the tension members 32. For example, it is desirable to have the material of the first portion 36 at least partially penetrate the exterior of the tension members 32 to provide sufficient pull out strength along the length of the load bearing assembly 30. The tension members 32 generally remain in a fixed position relative to the first portion 36.

A second portion 38 of the jacket 34 has a second, at least partially different polymer composition. While the illustration schematically shows a marked distinction between the first portion 36 and the second portion 38, the actual distinction between the two need not be in layered form. In some examples, there will be a gradual distinction between the material compositions of the interior portion (i.e., the first portion 36) of a jacket and the portion defining the exterior surface (i.e., the second portion 38). The second portion 38 in the illustration defines an exterior surface 40 of the load bearing assembly 30. The exterior surface may be the same around an entire exterior of the assembly 30 (e.g., the top, bottom and both sides in the illustrated example) or it may be different on various portions of the exterior. It is desirable to select a polymer composition for the second portion 38 to achieve a desired surface characteristic for the exterior surface 40 that provides a desired amount of traction on the drive sheave 26, for example. In this example, the polymer composition selected for the second portion 38 is at least partially different than that selected for the first portion 36.

The first portion 36 remains fixed relative to the second portion 38 and the tension members 32 remain fixed relative to the entire jacket 34.

Using different polymer compositions for the different portions of the jacket 34 allows for achieving the desired characteristics of the jacket to meet particular needs. For example, the first portion 36 can include a polymer composition that provides a sufficient jacket-to-tension member bond. At the same time, the polymer composition selected for the second portion 38 can provide the necessary traction characteristics. For example, the second portion 38 may have a lubricating effect and in some examples, it can contain any shear forces resulting from slip between the surface 40 and the traction sheave 26. This reduces deformation of the first portion 36 and reduces wear or damage to the load bearing assembly 30. Accordingly, the different needs associated with the different portions of the load bearing assembly 30 are accomplished using a jacket 34 designed according to an embodiment of this invention.

Many different polymers can be used to make the composition for each portion. Example polymer types include, but are not limited to, polyurethanes of all subtypes, nylons, polyesters, polyoelfins, fluorinated polymers, other halogenmated polymers, vulcanizable natural or synthetic rubber and silicones.

The different polymers in one example are of the same type with different properties. One example includes thermoplastic polyether polyurethanes having different hardness and elastic modulus.

The different polymers in another example are different types within a general polymer family with different properties. One example includes a thermoplastic polyether polyurethane and a thermoplastic polyester polyurethane, respectively. Different polymers from the same manufacturer or from different manufacturers can be used to establish the first and second portions of the jacket 34.

The following are some examples of such commercially available materials: Elastollan 1190A is a thermoplastic polyether polyurethane with a nominal Shore 90A hardness manufactured by BASF, Elastollan 1195A is a thermoplastic polyether polyurethane with a nominal Shore 95A hardness manufactured by BASF, Desmopan 9395A is a thermoplastic polyether polyurethane with a nominal Shore 95A hardness manufactured by Bayer, and Desmopan 385 is a thermoplastic polyester polyurethane with a nominal Shore 85A hardness manufactured by Bayer.

Figure 3:
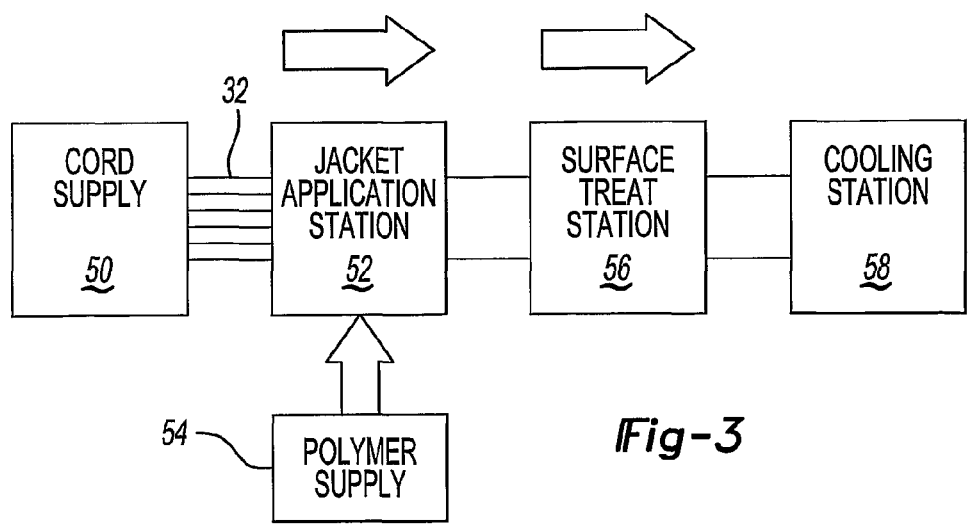
FIG. 3 schematically shows one example method of making a load bearing assembly.

FIG. 3 schematically illustrates an example method of making the load bearing member assembly 30 of FIG. 2. In this example method, a cord supply 50 provides the tension members 32 to a jacket application station 52. A polymer supply 54 provides at least one polymer composition for forming the jacket 34 at least partially around the tension members 32. Extrusion is one example forming process. The jacket is then treated at a surface treating station 56 and eventually cooled at a cooling station 58. The completed load bearing assembly is ready for shipment and installation in a known manner.

In one example, a single polymer composition is provided from the polymer supply 54 and applied onto the tension members 32 at the jacket application station 52. The surface treating station 56 then introduces at least one additional component onto at least the exterior surface 40 of the jacket 34 to achieve a desired surface characteristic. The addition of a surface-altering component is considered for purposes of this discussion to alter the polymer composition of at least the second portion 38 that includes the exterior surface 40.

In one example, a small amount of a traction modifying agent is applied to the hot polyurethane material of the jacket 34 as it exits an extrusion mold. Example traction modifying agents include wax, oil, ester amides, phthalate esters, polyolefins and mold release agents. Applying such a component in a sufficiently small amount modifies the exterior surface 40 of the jacket 34 to provide the desired traction level within an elevator system, for example. Application of the additional component in some examples diffuses that component into the polymer composition of the outer portion 38 of the jacket 34, which changes that composition compared to a remainder of the jacket 34. Introducing the additional component near the exterior surface 40 to reduce friction, for example, has no impact on the example first portion 36 of the jacket 34 and, therefore, does not interfere with any pull out strength characteristics of the jacket 34.

Figure 4:
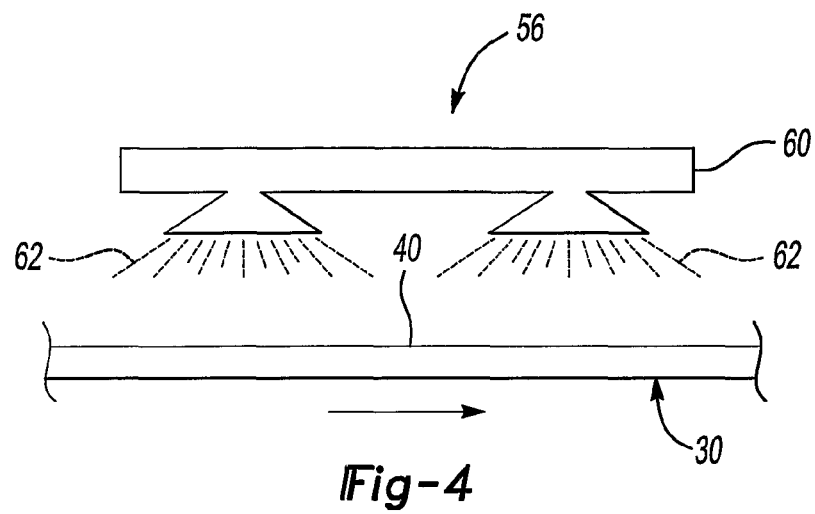
FIG. 4 schematically shows an example surface treating station useful with the embodiment of FIG. 3.

FIG. 4 schematically shows one example surface treating station 56 for modifying the second portion 38 of the jacket 34. In this example, a sprayer 60 comprises a micro-jet system that applies a small amount of a traction modifying component 62 onto the exterior surface 40 of the jacket 34 as the load bearing assembly 30 moves through the manufacturing machinery. Another example uses a pad application technique. Other techniques for applying a surface-modifying component may be used.

Figure 5:
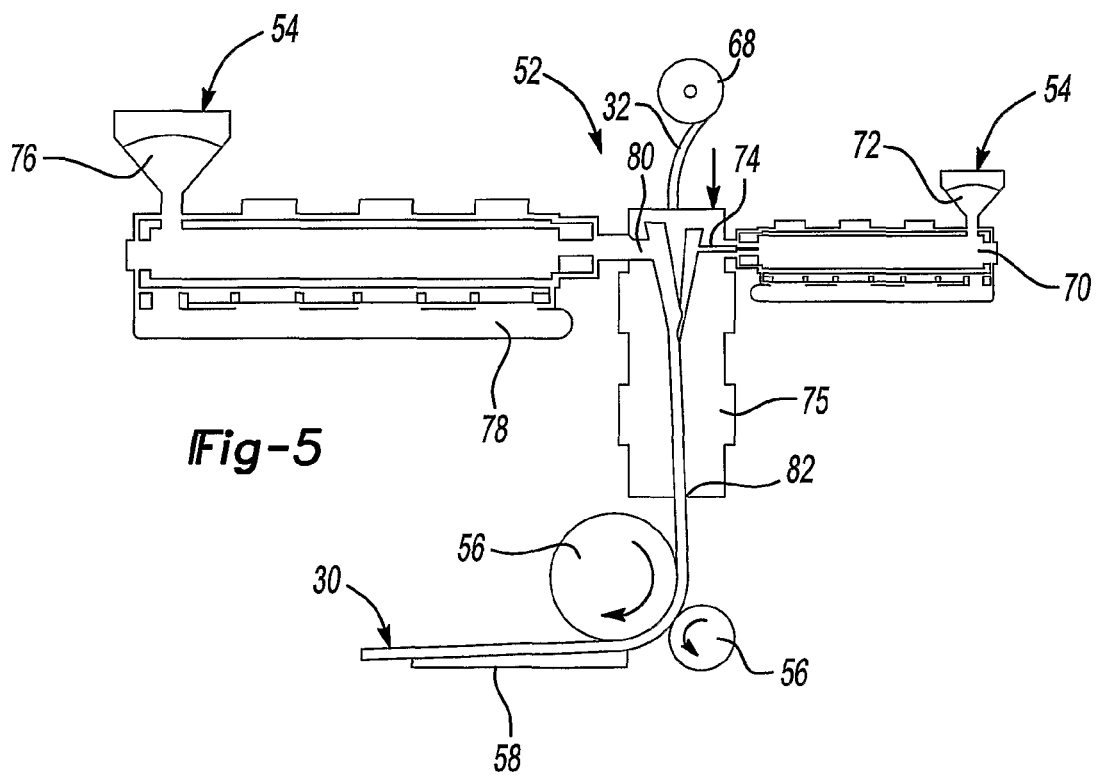
FIG. 5 schematically shows an example jacket application station useful with the embodiment of FIG. 3 for one example.

Another example approach to achieving a load bearing assembly that satisfies the different needs for different portions of a jacket includes a co-extrusion process using different polymer compositions to form the different portions of the jacket 34. FIG. 5 schematically illustrates a co-extrusion arrangement that is part of an example jacket application station 52. In this example, the polymer supply 54 provides different polymer compositions for different portions of the jacket 34. In the example of FIG. 5, at least one tension member 32 is provided from a spool 68, for example. A first extruder 70 processes a first polymer composition 72 in a known manner and feeds it through a first orifice 74 into a mold 75. A second extruder 78 processes a second polymer composition 76 in a known manner and feeds that into a second orifice 80 into the mold 75. Co-extrusion through the mold 75 results in a jacket 34 having a desired exterior configuration dictated by a mold exit 82.

Co-extrusion is a known process. Those skilled in the art who have the benefit of this description will be able to apply known co-extrusion techniques to achieve a load bearing assembly configuration to meet the needs of their particular situation.

In one example, the polymer compositions each comprise a distinct polyurethane material selected to meet the needs particular to the portion of the jacket 34 that is established by the corresponding part of the co-extruding machinery. In one example, the polyurethane material selected for the first portion 36 is chosen to maximize penetration of the material into the tension members 32 to increase adhesion and pull out strength. In one example, the efficiency of sheer load transfer and tension member bend fatigue life can be maximized by choosing an appropriate material for the first portion 36. Such materials are known and commercially available.

The other polymer composition in this example includes a second, distinct polyurethane (e.g., different from that used for the other polymer composition). The second polyurethane in this example is selected to have appropriate wear resistance and hardness to establish an exterior of the jacket 34. The material is also selected to have an appropriate friction characteristic to provide adequate traction and avoid adhesion as the load bearing assembly travels over sheaves within the elevator system.

In another example, the two polymer compositions comprise the same base polyurethane material but at least one of them has at least one added component to modify the composition. In one example, viscosity-altering additives are used to increase the tension member adhesion and pull out strength of the first portion 36. In another example, a friction-modifying component such as a wax or oil is added to the material used for forming the second portion 38. In another example, different additives are added to each of the polymer compositions. Example additives include plasticizers, processing aids, lubricants, friction modifying agents, colorants or filler materials. In one example, at least one polymer composition is free of any additives.

It should also be noted that although two different polymer compositions are discussed in the above examples, more than two could be used to meet the needs of a particular situation.

In one example, at least the second portion 38 includes thermoplastic fluoropolymers having a molecular weight greater than 800 for modifying the friction characteristics of the polymer material used as the base material for the second portion 38. Example polymer materials for such an embodiment include thermoplastic and thermoset polymeric materials such as polyurethanes, polyesters, polyamides, polyvinyl derivatives and silicone materials. Example fluoropolymers include polyvinylidene fluoride, polyvinyl fluoride, polyethylene-co-tetrafluoroethylene, viton (a fluorinated elastomer), perfluoroalkoxy fluorpolymer and fluorinated ethylene polymer. Each of these example fluoropolymers can be processed using thermoplastic processing methods over the range of an expected polymer extrusion for the given example polymers. The example fluoropolymers can be processed using molding processes having temperatures up to 400° C. The added fluoropolymers in such examples can be completely soluable, partly miscible or form a separate phase when extruded or processed with the polymer material used for establishing the second portion 38.

Using fluoropolymers having a molecular weight greater than 800 provides friction reducing qualities on the second portion 38 that effectively lubricates the surface 40 of the jacket 34 for better interaction with a sheave, for example. Using molecular weights greater than 800 has benefits compared to using lower molecular weight waxes or solid additives. Low molecular weight waxes have the disadvantage of migration over time that can change the friction modifying activity of such waxes. For example, if the migration results in the outer surface 40 becoming depleted of the wax, the friction will increase. Another disadvantage with lower molecular weight additives is that the migration may contaminate the first portion 36 of a jacket 34 in an undesirable manner.

The lubrication fluoropolymers of this example also have an advantage over solid fillers in that distribution is more controllable. Solid fillers may not be evenly distributed, which can present difficulties.

Using polymeric fluoropolymers with a molecular weight greater than 800 in one example includes selecting the fluoropolymers such that they have a melting point below the extrusion temperature of the primary polymer composition used to establish the corresponding portion of the jacket 34. Such fluoropolymers can be introduced to the primary polymer during preextrusion or mixed into the primary polymer before final extrusion and mixed into the polymer blend in the extruder. Given this description, those skilled in the art will be able to select appropriate concentrations to provide the desired lubrication at the interface between the surface 40 and the sheaves in an elevator system to meet their particular needs.

Another example embodiment includes using anisotropic materials, which provide the ability to allow limited slip between the load bearing member 30 and the traction sheave 26 in the direction parallel to the traction sheave surface. At the same time, the anisotropic materials resist flow or displacement at generally perpendicular angles to the sheave surface. This example includes using waxy materials that can form a solid film at the surface 40 that has properties to effectively separate the polymer of the jacket 34 from the traction sheave surface and allow limited microslip or shear within the waxy layer, allowing adjustments of strain within the polymer without forcing the polymer to directly slip on the traction surface. When strain is relieved, slip stops to thereby control traction. In this example, isolating shear away from the polymer of the jacket minimizes wear and damage that would otherwise occur to the jacket material during slip.

Example materials useful in such an embodiment include paraffin and polyethylene materials including, for example, beeswax, epoline, fluorinated linear polymers and copolymers, amide and ester derivatives of fatty acids (including but not necessarily limited to stearic, lauric, palymitic acids) and cholesteric or nematic liquid crystals (including but not necessarily limited to cholesteric acid derivates and other nematic and amide derivates).

One characteristic of such materials is that they orient under load or shear and become anisotropic. Under shear conditions, the molecules align to allow slip along the axis of the molecular chains. At the same time, the aligned molecules resist slip or flow at right angles to the molecular axis.

With such an example, the second portion 38 may include a layer near the surface 40 of such a material that effectively provides a lubricant between the sheave surface and the exterior surface 40 on the jacket 34. An advantage to incorporating such a lubricating layer into the manufacture of the load bearing member 30 is that better control over the distribution of the lubricating material is possible and there is no tendency for the material to have a negative impact on the polymer material used for forming the jacket 34.

Another example includes controlling the percentage of an additive used for controlling the friction characteristics of the surface 40. One example includes a concentration of an additive below 1 weight % of the additive with the actual concentration being selected to achieve a desired friction or traction characteristic. In another example, the concentration is below 0.5%. Example materials for such an embodiment include monotonic acid esters and similar derivatives. Another class of materials includes paraffin, bees wax or polyolefin low molecular weight polymers. These have the advantage of having minimal effect on a polyurethane's or other polymer material's adhesion properties so that they do not interfere with the cord pullout strength requirements of the load bearing member.

Another example includes adding a material that separates from the polyurethane or other polymer to form droplets that solidify on cooling. This example includes effectively disbursing particles that at least partially appear at the surface 40 throughout the thermoplastic urethane of an example jacket 34. One example includes adding such an additive to the material used to form the second portion 38 of the example jacket 34. In one example, a paraffin, beeswax-like or polyolefin based low molecular weight polymer (e.g., polyethylene, polypropylene, polybutene, etc.) is used as the additive. In one example, the percentage of such material added is in a concentration between about 0.1 weight % and 1 weight %. Some examples include higher percentages that still do not introduce the potential for interfering with the adhesion between base polymer material and the tension members 32.

In one example, such materials are used at levels below 0.5 weight %. At least one particular example includes an additive of this sort having a concentration below 0.01 weight %. Minimizing the amount of additive while still achieving the desired friction characteristics of the exterior surface of the jacket is desirable for minimizing the potential for introducing any compromise in the pullout strength. Given this description, the selected materials and the traction requirements of a particular installation, those skilled in the art will be able to select and appropriate percentage to meet their particular needs.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:
   an elevator car; and
   a load bearing assembly suspending the elevator car, the load bearing assembly including at least one elongated tension member; and
   a polymer jacket at least partially surrounding the tension member, the polymer jacket having a first portion that interfaces with the tension member and a second portion that defines an exterior surface of the jacket, the first portion comprising a first polymer composition and the second portion comprising a second, at least partially different polymer composition, wherein the first polymer composition comprises a first polyurethane and the second polymer composition comprises a second, different polyurethane.

2. A load bearing assembly for use in an elevator system, comprising:
   a plurality of tension members; and
   a polymer jacket that surrounds the tension members, the polymer jacket having a first portion that surrounds and interfaces with all of the tension members and a second portion that defines an exterior surface of the jacket, the first portion comprising a first polymer composition and the second portion comprising a second, at least partially different polymer composition, wherein the first polymer composition includes at least one base component comprising at least one of polyurethane, nylon, polyester, polyolefin, a fluorinated polymer, a halogenated polymer, vulcanizable natural rubber, synthetic rubber or silicone and the second polymer composition includes at least one base component that is different than the at least one base component of the first polymer composition, the at least one base component of the second polymer composition comprising at least one of polyurethane, nylon, polyester, polyolefin, a fluorinated polymer, a halogenated polymer, vulcanizable natural rubber, synthetic rubber or silicone, wherein at least the second polymer composition comprises at least one additive that separates from a base polymer of the second polymer composition upon cooling.

3. The assembly of claim 2, comprising a plurality of droplets of the additive in at least the second portion.

4. The assembly of claim 3, wherein at least some of the droplets are at least partially exposed along the exterior surface of the jacket.

5. A method of making a load bearing assembly for use in an elevator system, comprising:
   forming a jacket surrounding a plurality of tension members such that the jacket has a first portion comprising a first polymer composition surrounding and interfacing with all of the tension members and a second portion comprising a second, at least partially different polymer composition defining at least one exterior surface of the jacket, wherein the first polymer composition includes at least one base component comprising at least one of a polyurethane, nylon, polyester, polyolefin, fluorinated polymer, halogenated polymer, vulcanizable natural rubber, synthetic rubber or silicone and the second polymer composition includes at least one base component that is different than the at least one base component of the first polymer composition, the at least one base component of the second polymer composition comprising at least one of a polyurethane, nylon, polyester, polyolefin, fluorinated polymer, halogenated polymer, vulcanizable natural rubber, synthetic rubber or silicone;
   adding at least one additive to at least the second polymer composition; and
   cooling the second polymer composition such that the at least one additive separates from a base polymer of the second polymer composition.

6. The method of claim 5, including at least partially covering the first polymer composition with the second polymer composition.

7. The method of claim 5, wherein the first composition comprises a selected polyurethane and the second composition comprises the selected polyurethane and at least one other component that is distinct from components in the first polymer composition.

8. The method of claim 5, wherein the first composition comprises a first polyurethane and the second composition comprises a second, different polyurethane.

9. The method of claim 5, comprising applying at least one surface-modifying component to an exterior surface of the formed jacket.

10. The method of claim 9, including extruding the jacket using a mold and applying the surface-modifying component after the extruded jacket exits the mold.

11. The method of claim 10, including cooling the polymer jacket after applying the surface-modifying component.

12. The method of claim 9, wherein the surface-modifying component comprises at least one additive.

13. The method of claim 9, wherein applying the surface-modifying component contributes to the second polymer composition of the jacket at least near the exterior surface being different than the first polymer composition.

14. The method of claim 5, comprising forming a plurality of droplets of the additive in at least the second portion.

15. The method of claim 14, wherein at least some of the droplets are at least partially exposed along the exterior surface of the jacket.

16. The assembly of claim 1, wherein the load bearing assembly comprises a flat belt and the jacket has a generally rectangular cross-section across a width of the belt.

* * * * *